(12) United States Patent
Cooney et al.

(10) Patent No.: US 9,401,974 B2
(45) Date of Patent: Jul. 26, 2016

(54) SYSTEM AND METHOD OF BINDING A CLIENT TO A SERVER

(71) Applicant: Upland Software III, LLC, Austin, TX (US)

(72) Inventors: John M. Cooney, San Carlos, CA (US); Awais Ali, Santa Clara, CA (US); Fabrizio Talucci, San Jose, CA (US); Charlie Zimmerman, San Carlos, CA (US)

(73) Assignee: Upland Software III, LLC, Austin, TX (US)

( * ) Notice: Subject to any disclaimer, the term of this patent is extended or adjusted under 35 U.S.C. 154(b) by 0 days.

(21) Appl. No.: 14/102,401

(22) Filed: Dec. 10, 2013

(65) Prior Publication Data

US 2014/0181184 A1 Jun. 26, 2014

Related U.S. Application Data

(63) Continuation of application No. 12/551,299, filed on Aug. 31, 2009, now Pat. No. 8,606,874, and a continuation of application No. 11/043,680, filed on Jan. 26, 2005, now Pat. No. 7,676,599.

(60) Provisional application No. 60/539,768, filed on Jan. 28, 2004.

(51) Int. Cl.
*G06F 15/16* (2006.01)
*H04L 29/06* (2006.01)
*H04L 29/08* (2006.01)
*H04L 12/28* (2006.01)

(52) U.S. Cl.
CPC .............. *H04L 67/42* (2013.01); *H04L 67/101* (2013.01); *H04L 67/1002* (2013.01); *H04L 67/1006* (2013.01); *H04L 67/1008* (2013.01); *H04L 12/2856* (2013.01)

(58) Field of Classification Search
USPC ......................................................... 709/203
See application file for complete search history.

(56) References Cited

U.S. PATENT DOCUMENTS

| | | | |
|---|---|---|---|
| 5,402,481 A | 3/1995 | Waldman | 379/355 |
| 5,809,128 A | 9/1998 | McMullin | 379/215 |
| 5,987,103 A | 11/1999 | Martino | 379/93.17 |
| 6,014,440 A | 1/2000 | Melkild et al. | 379/269 |
| 6,091,732 A | 7/2000 | Alexander, Jr. et al. | 370/401 |
| 6,104,757 A | 8/2000 | Rhee | 375/240 |
| 6,118,768 A | 9/2000 | Bhatia et al. | 370/254 |
| 6,125,113 A | 9/2000 | Farris et al. | 370/389 |
| 6,141,345 A | 10/2000 | Goeddel et al. | 370/389 |
| 6,185,288 B1 | 2/2001 | Wong | 379/219 |
| 6,205,154 B1 | 3/2001 | Schmidt et al. | 370/458 |
| 6,351,730 B2 | 2/2002 | Chen | 704/229 |

(Continued)

OTHER PUBLICATIONS

Bennet, "Memory in a Flash" www.theage.com.au pp. 1-3 (2004).

(Continued)

*Primary Examiner* — Melvin H Pollack (57) ABSTRACT

Systems and methods to bind a client with a server are provided. A particular method includes establishing a connection between a server and a client. A list of best-fit server IP addresses is received at the client via the connection. A determination is made whether the server is identified in the list of best-fit server IP addresses. When the server is not identified in the list of best-fit server IP addresses, the connection to the server is terminated.

22 Claims, 3 Drawing Sheets

(56) References Cited

U.S. PATENT DOCUMENTS

| | | | |
|---|---|---|---|
| 6,359,880 B1 | 3/2002 | Curry et al. | 370/352 |
| 6,389,005 B1 | 5/2002 | Cruickshank | 370/352 |
| 6,434,139 B1 | 8/2002 | Liu et al. | 370/352 |
| 6,445,694 B1 | 9/2002 | Swartz | 370/352 |
| 6,449,251 B1 | 9/2002 | Awadallah et al. | 370/229 |
| 6,449,647 B1 * | 9/2002 | Colby et al. | 709/226 |
| 6,496,477 B1 | 12/2002 | Perkins et al. | 370/228 |
| 6,542,497 B1 | 4/2003 | Curry et al. | 370/352 |
| 6,597,686 B1 | 7/2003 | Smyk | 370/352 |
| 6,603,774 B1 | 8/2003 | Knappe et al. | 370/466 |
| 6,618,761 B2 | 9/2003 | Munger et al. | 709/241 |
| 6,636,504 B1 | 10/2003 | Albers et al. | 370/352 |
| 6,658,496 B1 | 12/2003 | Minakata et al. | 710/5 |
| 6,700,956 B2 | 3/2004 | Chang et al. | 379/93.09 |
| 6,725,303 B1 | 4/2004 | Hoguta et al. | 710/106 |
| 6,760,324 B1 | 7/2004 | Scott et al. | 370/352 |
| 6,763,226 B1 | 7/2004 | McZeal, Jr. | 455/90.2 |
| 6,766,348 B1 | 7/2004 | Combs et al. | 709/104 |
| 6,771,594 B1 | 8/2004 | Upadrasta | 370/228 |
| 6,788,769 B1 | 9/2004 | Waites | 379/93.24 |
| 6,795,540 B1 | 9/2004 | Mow | 379/188 |
| 6,822,957 B1 | 11/2004 | Schuster et al. | 370/389 |
| 6,826,174 B1 | 11/2004 | Erekson et al. | 370/352 |
| 6,856,612 B1 | 2/2005 | Bjelland et al. | 370/338 |
| 6,895,000 B2 | 5/2005 | Lai et al. | 370/352 |
| 6,901,438 B1 | 5/2005 | Davis et al. | 709/219 |
| 6,907,031 B1 | 6/2005 | Ehlinger et al. | 370/352 |
| 6,947,417 B2 | 9/2005 | Laursen et al. | 370/389 |
| 6,954,454 B1 | 10/2005 | Schuster et al. | 370/352 |
| 6,975,613 B1 | 12/2005 | Johansson | 370/338 |
| 6,986,030 B2 | 1/2006 | Shmueli et al. | 713/1 |
| 6,996,615 B1 | 2/2006 | McGuire | 709/226 |
| 7,012,888 B2 | 3/2006 | Schoeneberger et al. | 370/217 |
| 7,016,481 B2 | 3/2006 | McElvaney | 379/88.17 |
| 7,046,683 B1 | 5/2006 | Zhao | 370/401 |
| 7,092,380 B1 | 8/2006 | Chen et al. | 370/352 |
| 7,113,500 B1 | 9/2006 | Bollinger et al. | 370/352 |
| 7,117,269 B2 | 10/2006 | Lu et al. | 709/238 |
| 7,139,926 B1 | 11/2006 | Madhav et al. | 714/4 |
| 7,145,900 B2 | 12/2006 | Nix et al. | 370/352 |
| 7,152,111 B2 | 12/2006 | Allred et al. | 709/227 |
| 7,162,549 B2 | 1/2007 | Mambakkam et al. | 710/16 |
| 7,165,122 B1 | 1/2007 | Sitaraman et al. | 709/250 |
| 7,212,622 B2 | 5/2007 | Delaney et al. | 379/221.02 |
| 7,213,766 B2 | 5/2007 | Ryan et al. | 235/492 |
| 7,227,938 B2 | 6/2007 | Rodman et al. | 379/202.01 |
| 7,254,630 B1 | 8/2007 | Daude et al. | 709/224 |
| 7,269,180 B2 | 9/2007 | Bly et al. | 370/412 |
| 7,274,658 B2 | 9/2007 | Bornstein et al. | 370/227 |
| 7,275,113 B1 | 9/2007 | Araujo | 709/245 |
| 7,283,542 B2 | 10/2007 | Mitchell | 370/401 |
| 7,292,571 B2 | 11/2007 | Brown | 370/389 |
| 7,302,053 B2 | 11/2007 | Chang et al. | 379/220.01 |
| 7,307,982 B2 | 12/2007 | Burritt et al. | 370/352 |
| 7,325,133 B2 | 1/2008 | Fascenda | 713/168 |
| 7,359,963 B1 | 4/2008 | Huang et al. | 709/223 |
| 7,398,301 B2 * | 7/2008 | Hennessey et al. | 709/217 |
| 7,430,187 B2 | 9/2008 | Holt et al. | 370/329 |
| 7,441,045 B2 | 10/2008 | Skene et al. | 709/245 |
| 7,478,169 B2 | 1/2009 | Banerjee et al. | 709/245 |
| 7,496,648 B2 | 2/2009 | Manion et al. | 709/223 |
| 7,512,702 B1 | 3/2009 | Srivastava et al. | 709/238 |
| 7,631,055 B1 | 12/2009 | Stamler et al. | 709/220 |
| 7,653,746 B2 | 1/2010 | Touch et al. | 709/245 |
| 7,676,599 B2 | 3/2010 | Cooney et al. | |
| 7,783,777 B1 | 8/2010 | Pabla et al. | 709/238 |
| 7,827,292 B2 | 11/2010 | Chen et al. | 709/229 |
| 7,853,781 B2 | 12/2010 | Freed et al. | 713/151 |
| 8,606,874 B2 | 12/2013 | Cooney et al. | |
| 2001/0038033 A1 | 11/2001 | Habib | 235/375 |
| 2001/0052016 A1 | 12/2001 | Skene et al. | 709/226 |
| 2002/0029277 A1 | 3/2002 | Simpson-Young et al. | 709/228 |
| 2002/0052965 A1 | 5/2002 | Dowling | 709/230 |
| 2002/0097843 A1 | 7/2002 | Krol et al. | 379/88.01 |
| 2002/0131604 A1 | 9/2002 | Amine | 381/58 |
| 2002/0138648 A1 | 9/2002 | Liu | 709/245 |
| 2002/0184376 A1 | 12/2002 | Sternagle | 709/230 |
| 2002/0191621 A1 | 12/2002 | Jha | 370/401 |
| 2002/0191768 A1 | 12/2002 | Stoughton | 379/219 |
| 2003/0002479 A1 | 1/2003 | Vortman et al. | 370/352 |
| 2003/0023669 A1 | 1/2003 | DeLima et al. | 709/203 |
| 2003/0110257 A1 | 6/2003 | Hyun et al. | 709/224 |
| 2003/0112820 A1 | 6/2003 | Beach | 370/465 |
| 2003/0123388 A1 | 7/2003 | Bradd | 370/230 |
| 2003/0161453 A1 | 8/2003 | Veschi | 379/93.05 |
| 2003/0204619 A1 | 10/2003 | Bays | 709/238 |
| 2003/0214939 A1 | 11/2003 | Eldumiati et al. | 370/352 |
| 2003/0219006 A1 | 11/2003 | Har | 370/352 |
| 2004/0019539 A1 | 1/2004 | Raman et al. | 705/29 |
| 2004/0032860 A1 | 2/2004 | Mundra et al. | 370/352 |
| 2004/0047451 A1 | 3/2004 | Barker et al. | 379/67.1 |
| 2004/0086093 A1 | 5/2004 | Schranz | 379/37 |
| 2004/0114581 A1 | 6/2004 | Hans et al. | 370/356 |
| 2004/0133668 A1 | 7/2004 | Nicholas, III | 709/223 |
| 2004/0141508 A1 | 7/2004 | Schoeneberger et al. | 370/401 |
| 2004/0141758 A1 | 7/2004 | El-Reedy | 398/167.5 |
| 2004/0205023 A1 | 10/2004 | Hafer et al. | 705/43 |
| 2004/0205165 A1 | 10/2004 | Melamed et al. | 709/219 |
| 2004/0205777 A1 | 10/2004 | Zalenski et al. | 719/320 |
| 2004/0218583 A1 | 11/2004 | Adan et al. | 370/352 |
| 2004/0223458 A1 | 11/2004 | Gentle | 370/230 |
| 2004/0248590 A1 | 12/2004 | Chan et al. | 455/456.3 |
| 2004/0258003 A1 | 12/2004 | Kokot et al. | 370/254 |
| 2005/0002506 A1 | 1/2005 | Bender et al. | 379/142.01 |
| 2005/0074031 A1 | 4/2005 | Sunstrum | 370/493 |
| 2005/0089052 A1 | 4/2005 | Chen et al. | 370/401 |
| 2005/0091392 A1 | 4/2005 | Gesswein et al. | 709/231 |
| 2005/0094621 A1 | 5/2005 | Acharya et al. | 370/352 |
| 2005/0111494 A1 | 5/2005 | Kecskemeti | 370/521 |
| 2005/0138183 A1 | 6/2005 | O'Rourke et al. | 709/228 |
| 2005/0141560 A1 | 6/2005 | Muthiah | 370/474 |
| 2005/0165953 A1 | 7/2005 | Oba et al. | 709/238 |
| 2005/0180464 A1 | 8/2005 | McConnell et al. | 370/494 |
| 2005/0195799 A1 | 9/2005 | Burne et al. | 370/352 |
| 2005/0201414 A1 | 9/2005 | Awais | 370/468 |
| 2005/0220083 A1 | 10/2005 | Takeuchi | 370/352 |
| 2005/0243733 A1 | 11/2005 | Crawford et al. | 370/252 |
| 2006/0008059 A1 | 1/2006 | Ying et al. | 379/88.17 |
| 2006/0029062 A1 | 2/2006 | Rao et al. | 370/389 |
| 2006/0029063 A1 | 2/2006 | Rao et al. | 370/389 |
| 2006/0034296 A1 | 2/2006 | Talucci | 370/395.52 |
| 2006/0037071 A1 | 2/2006 | Rao et al. | 726/13 |
| 2006/0039356 A1 | 2/2006 | Rao et al. | 370/352 |
| 2006/0088025 A1 | 4/2006 | Barkley et al. | 370/352 |
| 2006/0208066 A1 | 9/2006 | Finn et al. | 235/380 |
| 2006/0276230 A1 | 12/2006 | McConnell | 455/563 |
| 2007/0248081 A1 | 10/2007 | Barkley et al. | 370/352 |
| 2008/0025291 A1 | 1/2008 | Barkley et al. | 370/352 |

OTHER PUBLICATIONS

"Brief Introduction to QiiQ Communications Inc. and Eccocarrier Inc." www.qiiq.com pp. 1-7 (printed Jun. 10, 2005 and Jul. 17, 2007).

Camarillo, et al., "Integration of Resource Management and Session Initiation Protocol (SIP)" *RFC 3312* pp. 1-30 (2002).

"CommGenie VoIP Suite" www.nexge.com pp. 1-3 (printed Jun. 1, 2005).

EcoCarrier, "Ecophone" www.ecocarrier.com pp. 1-3 (printed Jun. 13, 2005).

"EcoFone + VoIP!Phone Q-FONE-USB" pp. 1-3 (printed Jun. 10, 2005).

"Pocki Phone-VoIP Softphone + USB Flash Disk Drive (128M)" www.welltech.com pp. 1-2 (printed Oct. 5, 2004).

"Pre-paid Call Credits-Adding Extra Call Credits" www.2hands.com.au pp. 1-2 (printed Jun. 1, 2005).

Rosenberg, J. et al., "SIP: Session Initiation Protocol" *RFC 3261* pp. 1-18 (2002).

Rosenberg, J. et al, "STUN-Simple Traversal of User Datagram Protocol (UDP) Through Network Address Translators (NATs)" *RRC 3489* pp. 1-47 (2003).

Schulzrinne, H., "Dynamic Host Configuration Protocol (DHCP-for-IPv4) Option for Session Initiation Protocol (SIP) Servers" *RFC 3361* pp. 1-7 (2002).

(56) References Cited

OTHER PUBLICATIONS

"SIPphoneCasting. Inspired by: Skype Podcast Recorder = SkypeCasters" www.linuxathome.com pp. 1-4 (Dec. 29, 2004).
Tittel, E., "Cool Tools: USB Desktop Peripherals and Devices" www.certmag.com pp. 1-7 (Jun. 2005 accessed Jul. 20, 2007).
Trembley, J., "VoIP makes real-time billing a necessity" (2004) *Billing Plus* 6(17): 13 (2004).
"Web Based VoIP Billing, VoIP Routing, and VoIP Management Software" www.webvoip.com pp. 1-2 (printed Jun. 1, 2005).
Notice of Allowance dated Aug. 6, 2013, mailed in U.S. Appl. No. 12/551,299, pp. 1-15.
Request for Continued Examination (RCE) and RCE Submission as filed in U.S. Appl. No. 12/551,299 on Apr. 12, 2011, pp. 1-11.
Examiner Interview Summary Record dated Apr. 7, 2011, mailed in U.S. Appl. No. 12/551,299, pp. 1-4.
Final Rejection dated Feb. 10, 2011, mailed in U.S. Appl. No. 12/551,299, pp. 1-18.
Response to Non-Final Office Action dated Oct. 1, 2010, as filed in U.S. Appl. No. 12/551,299 on Nov. 23, 2010, pp. 1-7.
Non-Final Office Action dated Oct. 1, 2010, mailed in U.S. Appl. No. 12/551,299, pp. 1-16.
Notice of Allowance dated Jun. 30, 2009, mailed in U.S. Appl. No. 11/043,680, pp. 1-12.
Supplemental Response to Non-Final Office Action dated Dec. 23, 2008, as filed in U.S. Appl. No. 11/043,680 on Apr. 29, 2009, pp. 1-12.
Examiner Interview Summary Record dated Apr. 2, 2009, mailed in U.S. Appl. No. 11/043,680, pp. 1-4.
Response to Non-Final Office Action dated Dec. 23, 2008, as filed in U.S. Appl. No. 11/043,680 on Feb. 16, 2009, pp. 1-7.
Non-Final Office Action dated Dec. 23, 2008, mailed in U.S. Appl. No. 11/043,680, pp. 1-12.
Request for Continued Examination (RCE) and RCE Submission as filed in U.S. Appl. No. 11/043,680 on Oct. 14, 2008, pp. 1-15.
Final Rejection dated Jul. 29, 2008, mailed in U.S. Appl. No. 11/043,680, pp. 1-22.
Response to Non-Final Office Action dated Nov. 20, 2006, as filed in U.S. Appl. No. 11/043,680 on Aug. 6, 2007, pp. 1-5.
Non-Final Office Action dated Nov. 20, 2006, mailed in U.S Appl. No. 11/043,680, pp. 1-12.

\* cited by examiner

SYSTEM AND METHOD OF BINDING A CLIENT TO A SERVER

CROSS-REFERENCE TO RELATED APPLICATIONS

The present application claims priority from and is a continuation from U.S. patent application Ser. No. 12/551,299, filed Aug. 31, 2009, which is a continuation from U.S. patent application Ser. No. 11/043,680, filed Jan. 26, 2005 (now U.S. Pat. No. 7,676,599), which claims priority to U.S. Provisional Patent Application Ser. No. 60/539,768, filed on Jan. 28, 2004, all herein incorporated by reference in their entireties.

BACKGROUND

The present disclosure relates generally to implementation of client-server networks. More particularly, the disclosure provides systems and methods for maintaining the binding of a client, particularly a client with limited computational and storage resources, with at least one server.

The Internet has had a profound impact on the way society communicates. Today, the Internet is used for personal communications, for business communications, for shopping, for entertainment, for news, and more.

There are many applications that rely on a client being in constant contact With a sewer in order to perform a task. The client to sewer connection (binding) may be mission critical and may be maintained constantly. For example, an interruption iii communications of approximately thirty seconds within a one-hour interval may be intolerable. Factors that may influence the client being in constant contact with the server include: The client may reside on a small, specialized computer, with limited computational and storage resources (herein, an "Internet Appliance"). To remove the potential for a "single point of failure" multiple servers may be deployed, geographically separated and independently addressable on the Internet. The number of servers may range into the hundreds. When many clients (e.g., millions of clients) are expected, clients may be distributed across available servers to reduce the impact of a server failing and to maintain responsiveness of client/server bindings. The binding between client and server may be dynamic. There are many potential causes for a client to need to change the server to which it is bound.

The desire for dynamic binding between a client and server may be related to a number of factors. To ensure that combined server resources are being allocated to provide optimal service to all clients, clients are distributed among servers. The distribution takes into account the "routing distance" between a client and the server (the number of Internet hops as well as message delivery latency). As more clients are added, the distribution may become sub-optimum and adjustment may be appropriate. In turn, some clients may be redirected to different servers. Another benefit of dynamic binding between client and server may be to provide for continuity of client services in the event a server fails or is pulled off-line for maintenance.

One approach for a client to identify and then bind with a server relies on the Internet Distributed Name Service (DNS), which can associate a static list of Internet IP addresses with a name. While machines respond to IP addresses in the form of number strings, humans are not as adept at remembering number strings. A name server (or DNS server) receives a name from a client, associates the name with an IP address, and sends the IP address to a client. The client then communicates with a server via the server's IP address.

The DNS is, however, far from simple. Name servers may receive millions of requests each day. Because a single name server may not know the address associated with a particular name, name servers may also be able to contact other name servers. A name server may start its search for an IP address by contacting one of the root name servers. The root name servers may know the IP address for all of the name servers that handle the top-level domains. For example, a name server might "ask" a root name server for the IP address associated with www.yahoo.com, and the root name server might "respond" (assuming no caching), that it does not know the IP address for www.yahoo.com, and instead provide the IP address for the COM name server. One of the keys to making this work is redundancy. There may be multiple name servers at every level, so if one fails, there are others to handle the requests.

To speed up the process, name servers may cache the IP addresses returned in response to requests. Name servers may not cache forever, though. The caching may use a component, called the Time To Live (TTL) that controls how long a name server will cache a piece of information. When a name server receives an IP address, it may receive the TTL with it. The name server may cache the IP address for that period of time (ranging from minutes to days) and then discard it. Using TTL enables changes to propagate to the name servers.

Not all name servers respect the TTL they receive, however. This means that new information and old information may reside in the DNS at the same time. Sometimes, it may take weeks for a change in an IP address to propagate throughout the Web. Additionally, implementing a DNS protocol on an Internet Appliance may require additional computational, program storage and data storage resources that may not be available or desirable to add.

SUMMARY OF THE INVENTION

Provided herein is a method of binding a client to a server, the method comprising: establishing a connection between a server and a client; receiving, at the client via the connection, a list of best-fit server Internet Protocol (IP) addresses; determining whether the server is identified in the list of best-fit server IP addresses; and terminating the connection to the server when the server is not identified in the list of best-fit server IP addresses.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE INVENTION

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments disclosed herein enable a client to receive and maintain a set of "best-fit" server IP addresses. The best fit server IP addresses establish a hierarchy of server addresses that are used by a client to maintain a binding with a server without using the DNS. In the case of an Internet Appliance, the set of best-fit server IP addresses may be relatively small. In one embodiment, an Internet Appliance maintains a set of three best-fit server IP addresses. However, this is not meant as a limitation. As will be apparent to those skilled in the art, any number of best-fit server IP addresses may be maintained by a client/Internet Appliance without departing from the scope of the present disclosure. Communicating the set of best-fit server IP addresses to a specific client may be accomplished using extensions of a network protocol already used to support client/server communications, thus minimizing the amount of code needed to support the additional information transfer.

It is therefore an aspect of particular embodiments to provide and maintain a set of best-fit server IP addresses with a client.

It is an aspect of particular embodiments to provide a set of best-fit server IP addresses to a client via a protocol used by the client and server to establish and/or conduct communications.

It is an aspect of particular embodiments to use a set of best-fit server IP addresses to dynamically bind a client with a server, either at the initialization of a session between the client and server or as a result of a loss of connectivity between the client and server, without using DNS.

Another aspect of particular embodiments is to minimize overhead required to dynamically bind a client with a server without using DNS.

These and other aspects of particular embodiments will become apparent from a review of the general and detailed descriptions that follow.

A particular embodiment provides a method for maintaining the binding of a client with a server. A server creates a list including of a list of best-fit server IP addresses for a client. Optionally, the list of best-fit server IP addresses are ordered according to network distribution criteria, such as a routing distance between the client and each server associated with each of the list of best-fit server IP addresses, a message delivery latency, and server loading. A transmission protocol used by the client and the server is extended for communications to transport the best-fit server IP list. The best-fit server IP list is sent to the client. In another embodiment, a Session Initiation Protocol (SIP) protocol message is extended and the best-fit server IP list is sent to the client using the extended SIP protocol message including the best-fit server IP list.

Another particular embodiment provides a method for initiating the binding of a client with a server. A best-fit server IP address is selected by a client from a list of best-fit server IP addresses. An attempt is made by the client to initiate a session with a server using the selected best-fit server IP address. In the event the first attempt to initiate a session fails, a next best-fit server IP address is selected from a best-fit server IP address list. The client makes a next attempt to initiate a session with a server using the next selected best-fit server IP address. In another embodiment, the best-fit server IP address list is ordered according to network distribution criteria. Optionally, the distribution criteria may include a routing distance between the client and each server associated with each of the list of best-fit server IP addresses, message delivery latency, and server loading. Selecting the first and next best-fit server IP addresses from a best-fit server IP address list includes selecting the best-fit server IP addresses according to the order in which the best-fit server IP addresses appear on the best-fit server IP address list.

Another particular embodiment provides a method for maintaining the binding of a client with a server. A transmission protocol used by the client and the server is extended for communications. The extended transmission protocol is used by the client to request a best-fit server IP list from the server, wherein the best-fit server IP list includes a list of best-fit server IP addresses. The best-fit server IP list is received and stored by the client. In an embodiment, a Simple Traversal of User Datagram Protocol through Network Address Translators (NATs) (STUN) protocol message is extended and used to request the best-fit server IP list.

In yet another embodiment, the client determines whether the IP address of a server is on the best-fit IP address list. In the event that the server is not on the best-fit IP address list, the client terminates its association with the server and selects a best-fit server IP address from a best-fit server IP address list. An attempt may be made by the client to initiate a session using the selected best-fit server IP address. In the event the first attempt to initiate a session fails, a next best-fit server IP address may be selected from the best-fit server IP address list. A next attempt may be made by the client to initiate a session using the next selected best-fit server IP address. Optionally, the best-fit server IP addresses may be ordered according to network distribution criteria. The network distribution criteria may include a routing distance between the client and each server associated with each of the list of best-fit server IP addresses, message delivery latency, and server loading.

In another embodiment, the client determines whether a connection between the client and a server has been lost. In the event that the connection has been lost, a best-fit server IP address is selected from the best-fit server IP address list. An attempt is made by the client to initiate a session using the selected best-fit server IP address. In the event the first attempt to initiate a session fails, a next best-fit server IP address is selected from a best-fit server IP address list. The client makes a next attempt to initiate a session using the next selected best-fit server IP address.

Optionally, the best-fit server IP addresses may be ordered according to network distribution criteria. The network distribution criteria may include a routing distance between the client and each server associated with each of the list of best-fit server IP addresses, message delivery latency, and server loading.

Embodiments enable a client to receive and maintain a set of "best-fit" server IP addresses. The best fit server IP addresses may establish a hierarchy of server addresses that may be used by a client to maintain a binding with a server without using the DNS. In the case of an Internet Appliance, the set of best-fit server IP addresses may be relatively small. In one embodiment, an Internet Appliance maintains a set of three best-fit server IP addresses. Communicating the set of best-fit server IP addresses to a specific client may be accomplished using extensions of network protocols already used to support client/server communications, thus minimizing the amount of code needed to support the additional information transfer.

Figure 1:
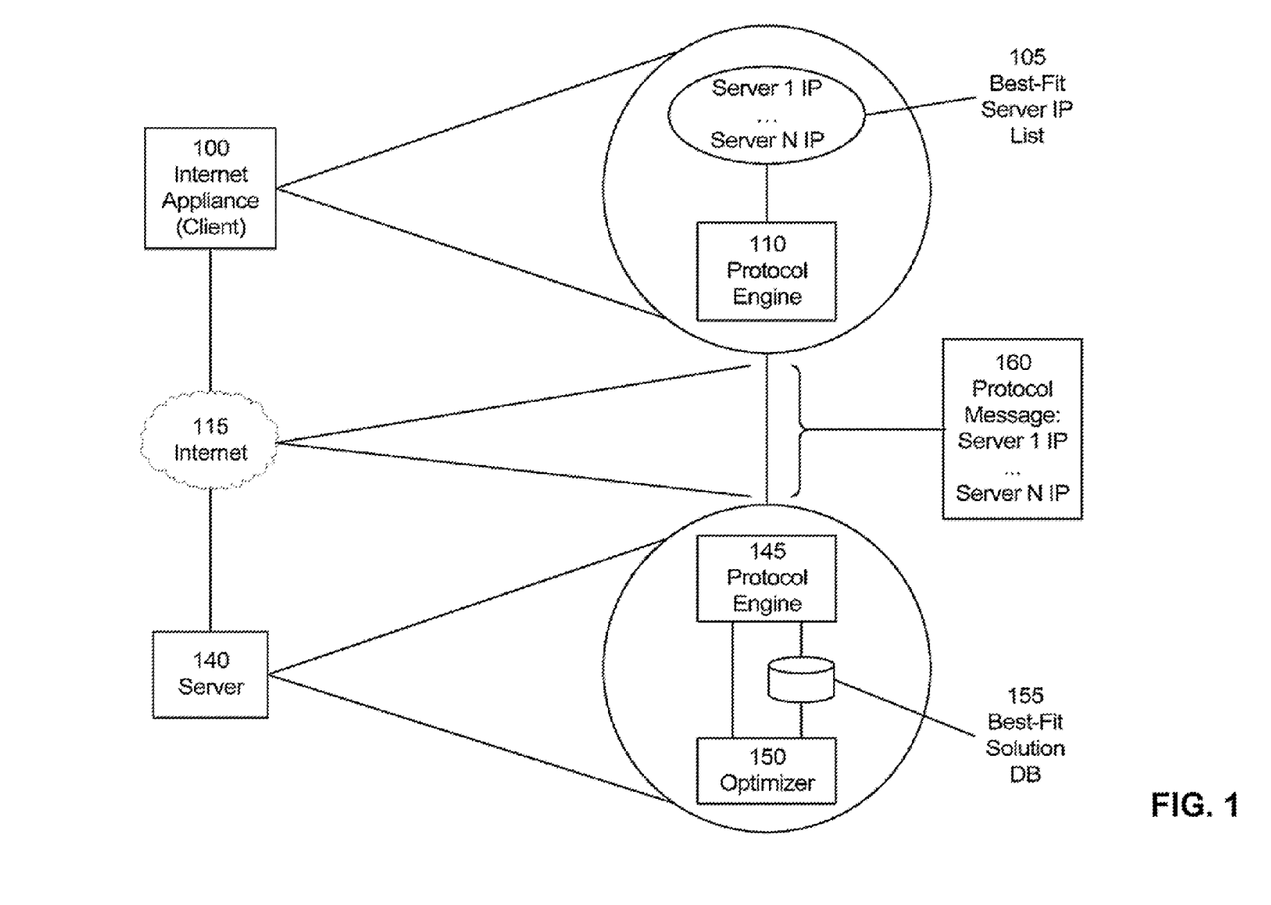
FIG. 1 illustrates the interaction of an Internet Appliance with a server according to particular embodiments.

FIG. 1 illustrates the interaction of an Internet Appliance with a server according to particular embodiments. Referring to FIG. 1, an Internet Appliance (client) 100 includes a protocol engine 110 connected to the Internet 115. The protocol engine 110 communicates via the Internet 115 with a corresponding protocol engine 145 in a server 140. As part of this communication, a protocol message 160 listing best-fit server IP addresses is passed from the server 140 to the Internet Appliance (client) 100. The Internet Appliance (client) 100 extracts this information from the protocol message 160 and saves this information in persistent memory (not illustrated) as a best-fit server IP list 105.

In order to construct the protocol message 160 including the best-fit IP addresses, the protocol engine 145 on the server 140 is integrated with a best-fit solutions database 155. In this embodiment, the best-fit solutions database 155 is updated by an optimizer program 150 that runs as a background application on the server 140. However, this is not meant as a limitation. As would be apparent to those skilled in the art, other means may be used to create the best-fit IP addresses. By way of illustration and not as a limitation, in an embodiment, the best-fit IP addresses are computed on-the-fly (by the protocol engine 145 or a linked device) based on the latest routing and server availability information.

Figure 2:
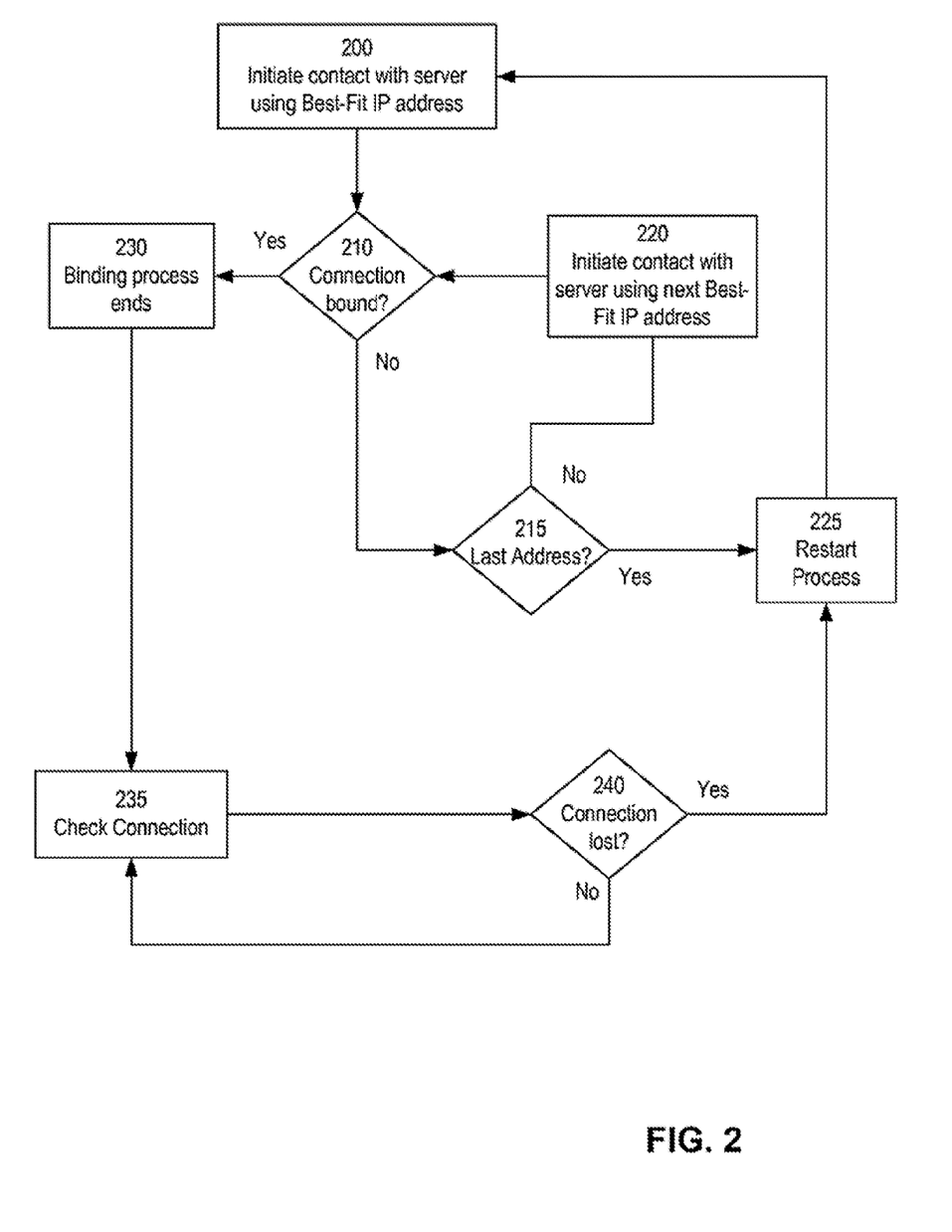
FIG. 2 illustrates a process according to particular embodiments in which an Internet Appliance (client) uses best-fit IP address to create a binding with a server.

FIG. 2 illustrates a process according to embodiments in which an Internet Appliance (client) uses best-fit IP address to create a binding with a server. Referring to FIG. 2, a client initiates contact with a server using a first best-fit IP address in a list at 200. If the connection is bound at 210, the binding process ends at 230. If the client is not bound to a server at 210, a check is made at 215 to determine if the last-tried best-fit address was the last address. If the last-tried best-fit address was the last address, the binding process is restarted at 225. If the last-tried best-fit address is not the last address, contact is initiated using the next best-fit address at 220.

When a binding is successful (at 230), the connection may be checked at 235 to determine if the connection has been lost at 240. If the connection has not been lost at 240, the checking process is repeated at 235. If the connection has been lost, the binding process is restarted at 225. If none of the servers in the best-fit server IP address list (shown in FIG. 1 at 105) responds then, a "catastrophic" failure has occurred. This could be because the user's Internet access has been impaired, because a sufficiently large part of the Internet is disabled preventing access to any of the servers in the best-fit list, or because a sufficiently large physical event has caused all the servers in the best-fit list to become inoperable. When a "catastrophic" failure occurs, the client continues to contact the servers on its best-fit server IP list until the network problem is corrected. This re-use of the initialization procedure helps address the constraint of scarce storage resources on the Internet Appliance.

In an embodiment, the list of best-fit server IP addresses (shown in FIG. 1 at 105) is ordered such that elements closer to the top of the list are "more optimal" than lower items on the list. Thus, the binding process illustrated in FIG. 2 attempts to bind with the more optimal server first. In this context, "more optimal" reflects the result of analysis done prior to the last download of the best-fit list from the server to the client. Note subsequent to the last sending of the best-fit list and the time when the client is bound to a server, the physical location or Internet "routing distance" may have changed thereby changing the optimization of the best-fit list.

Figure 3:
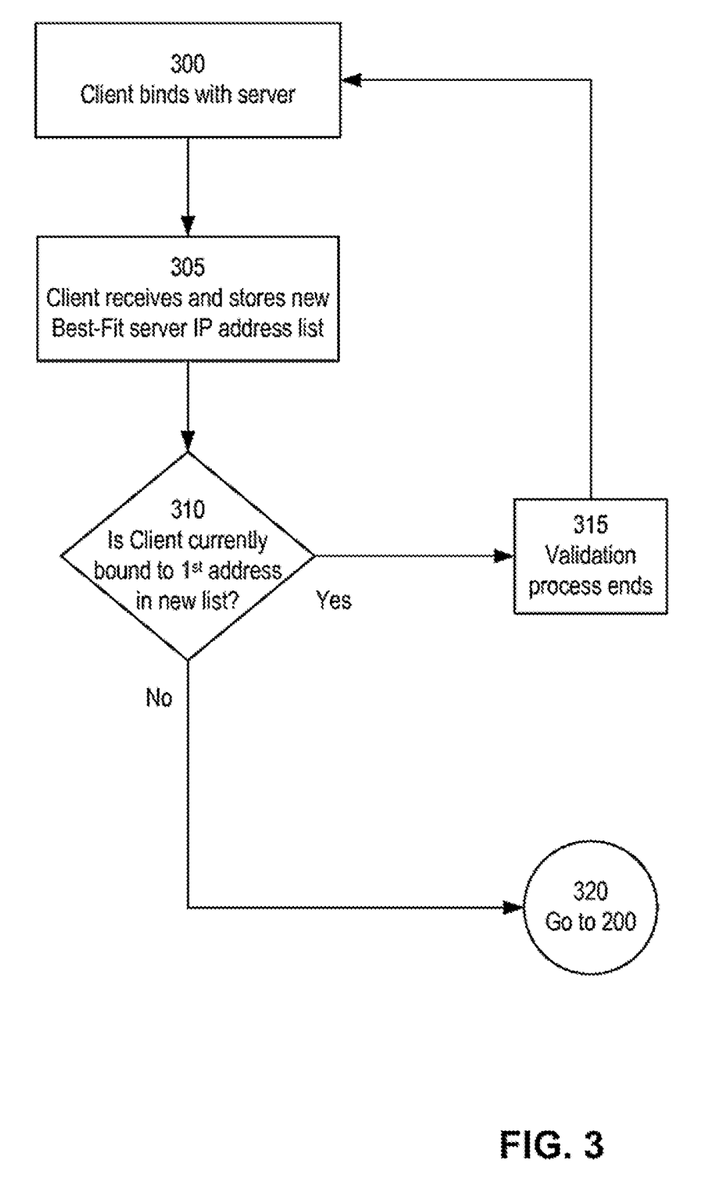
FIG. 3 illustrates a process of receiving and verifying a best-fit list by a client according to particular embodiments.

FIG. 3 illustrates a process of receiving and verifying a best-fit server IP address list by a client according to particular embodiments. Referring to FIG. 3, a client binds with a server at 300. A new best-fit server IP address list is received and stored by the client 305 for access during power up initialization. Once stored, the client determines whether it is currently bound to a server having the first best-fit address in the new list at 310. If it is not, then the client initiates a binding process as illustrated in FIG. 2. If the client is currently bound to the server having the first best-fit server IP address in the new best-fit server IP address list, the validation process ends at 315.

As previously noted, the server may determine the best-fit list of server IP addresses and may communicate this information to the client via a extension of a network protocol currently used by the client and server to establish or maintain existing communications. In an embodiment, a protocol engine at the server is extended to accept a best-fit server IP address list and communicate it to each client associated with that server. In the event the server associated with a client is no longer on the list of best-fit server IP addresses, the client will terminate the association and attempt to connect with a server on the last-received list. The server represented by the first server IP address on the new best-fit server IP address list is then associated with the client.

In a particular embodiment, a network protocol used by a client and server to convey information relating to the best-fit server IP address list is extended. In order to avoid issues with firewalls and network address translation systems, a preferred protocol may support sessions initiated by the client that allow subsequent responses by the server. Additionally, the preferred protocol may support communication at a frequency that facilitates timely communication of new best-fit server IP address lists and may be adaptable to accept the simple payload data used for the best-fit server IP address list.

In an exemplary embodiment, a client and server use multiple protocols to send and update best-fit server IP address information. By way of illustration and not as a limitation, a server may communicate with a client via Session Initiation Protocol (SIP). This protocol meets the preferred criteria that a session is initiated by the client while allowing the server to send the client a message at any time. However, processing of the SIP protocol for both the client and the server requires considerable work. This is of particular concern where the client resides on an Internet Appliance with very little computation resources. In addition to SIP, the client in this exemplary embodiment may also use the Simple Traversal of User Datagram Protocol through Network Address Translators (NATs) (STUN) protocol. STUN lacks that quality of being able to respond to a server-generated message at any time, but has the advantage that it is very simple to process and extend. These two protocols, however, may be used in combination to perform the tasks of sending a list of best-fit server IP addresses to the client and sending the client notice that the list has been updated. The server may use a SIP protocol extension to notify the client. The client may use the STUN protocol to request and receive the new list.

A system and method for permitting a client running on an Internet Appliance to dynamically bind with at least one server without using DNS has been illustrated. It will be understood by those skilled in the art that the present disclosure may be embodied in other specific forms without departing from the scope of the disclosure and that the examples and embodiments described herein are in all respects illustrative and not restrictive. Those skilled in the art will recognize that other embodiments using the concepts described herein are also possible.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A method comprising:
   executing a program by a computer system that initiates binding of a client computer system to a server computer system utilizing best-fit server Internet Protocol (IP) addresses to maintain and end connections between the client computer system and the server computer system, wherein executing the program transforms the computer system into a machine to perform:
   establishing a connection between a server and a client;
   receiving, at the client computer system via the connection, a list of the best-fit server IP addresses;
   determining, at the client, whether the server computer system is identified in the list of best-fit server IP addresses;
   maintaining the connection to the server computer system in response to determining that the server computer system is identified in the list of best-fit server IP addresses; and
   ending the connection to the server computer system in response to determining that the server computer system is not identified in the list of best-fit server IP addresses.

2. A server device, comprising:
   a processor; and
   a memory accessible to the processor that includes a program that is executable by the processor to initiate binding of a client device to the server device utilizing best-fit server Internet Protocol (IP) addresses to maintain and end connections between the client computer system and the server device, wherein executing the program transforms the server device into a machine that includes:
   a protocol engine executable by the processor to:
   establish a connection to the client device; and
   send a list of best-fit server IP addresses to the client device via the connection, wherein the list of best-fit server IP addresses is determined based on network distribution criteria;
   wherein the client device ends the connection to the server device in response to determining that an address of the server device is not identified in the list of best-fit server IP addresses; and
   wherein the client device maintains the connection to the server device in response to determining that the address of the server device is identified in the list of best-fit server IP addresses.

3. A client device, comprising:
   a processor;
   a memory accessible to the processor that includes a program that is executable by the processor to initiate binding of a client device to the server device utilizing best-fit server Internet Protocol (IP) addresses to maintain and end connections between the client computer system and the server device, wherein executing the program transforms the client device into a machine that includes:
   a protocol engine executable by the processor to:
   establish a connection between a server and the client device;
   receive, at the client device via the connection, a list of best-fit server IP addresses;
   determine whether the server is identified in the list of best-fit server IP addresses;
   maintain the connection to the server in response to determining that the server is identified in the list of best-fit server IP addresses; and
   end the connection to the server in response to determining that the server is not identified in the list of best-fit server IP addresses.

4. The method of claim 1, wherein the list of best fit server IP addresses includes at least three server IP addresses.

5. The method of claim 4, wherein the at least three server IP addresses are arranged in an order of preference in the list of best fit server IP addresses.

6. The method of claim 1, further comprising initiating establishment of a connection to at least one server IP address of the list of best fit server IP addresses after ending the connection to the server computer system.

7. The method of claim 1, further comprising:
   determining, at the client, whether the connection to the server computer system has been lost; and
   when the connection to the server has been lost, initiating establishment of a connection to a first server IP address that is retrieved from the list of best fit server IP addresses.

8. The method of claim 7, wherein, when the connection to the first server IP address is not established, initiating establishment of a connection to a next server IP address in the list of best fit server IP addresses.

9. The method of claim 1, further comprising sending a request for the list of best fit server IP addresses from the client computer system to the server computer system via the connection using a first protocol, wherein the list of best-fit server IP addresses is received by the client computer system using a second protocol.

10. The method of claim 1 wherein the best fit server IP addresses establish a hierarchy of server addresses, the method further comprising:
   executing the program by the computer system to cause the client computer system to use the IP addresses to maintain a binding with the server computer system without using a domain name server.

11. The server device of claim 2, wherein the protocol engine sends the list of best-fit server IP addresses via a Session Initiation Protocol (SIP) message.

12. The server device of claim 2, wherein the protocol engine sends the list of best-fit server IP addresses in response to a request from the client.

13. The server device of claim 12, wherein the request is received via a Simple Traversal of User Datagram Protocol through Network Address Translators (NATs) (STUN) message.

14. The server device of claim 2, wherein the memory further comprises an optimizer program that is executable by the processor to select the list of best-fit server IP addresses based on routing and availability information.

15. The server device of claim 14, wherein addresses on the list of best-fit server IP addresses are determined based on a database of best-fit solutions.

16. The server device of claim 14, wherein addresses on the list of best-fit server IP addresses are dynamically computed.

17. The server device of claim 14, wherein the optimizer program identifies an order of preference of the IP addresses of the list of best-fit server IP addresses.

18. The server device of claim 14, wherein the routing and availability information includes at least one of a routing distance, a message delivery latency, and server loading.

19. The client device of claim 3, wherein the memory stores the list of best-fit server IP addresses.

20. The client device of claim 19, wherein, after the client device ends the connection to the server, the client device accesses the list of best-fit server IP addresses in the memory, selects a first server from the list of best-fit server IP addresses, and attempts to establish a connection to the first server based on an order of the list of best-fit server IP addresses.

21. The client device of claim 20, wherein, when the client device is not able to establish the connection to the first server, the client device accesses the list of best-fit server IP addresses in the memory, selects a second server from the list of best-fit server IP addresses, and attempts to establish a connection to the second server based on an order of the list of best-fit server IP addresses.

22. The client device of claim 3 wherein the best fit server IP addresses establish a hierarchy of server addresses, wherein the program is further executable by the processor to:
   use the IP addresses to maintain a binding with the server computer system without using a domain name server.

* * * * *